(12) United States Patent
Chakraborty et al.

(10) Patent No.: US 9,886,312 B2
(45) Date of Patent: Feb. 6, 2018

(54) DYNAMIC PROVISIONING OF VIRTUAL VIDEO MEMORY BASED ON VIRTUAL VIDEO CONTROLLER CONFIGURATION

(75) Inventors: Parag Chakraborty, Sunnyvale, CA (US); Bradley Post, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/247,116

(22) Filed: Sep. 28, 2011

(65) Prior Publication Data

US 2013/0076768 A1 Mar. 28, 2013

(51) Int. Cl.
*G06F 9/50* (2006.01)
*G06T 1/60* (2006.01)
*G06F 9/455* (2006.01)
*H04N 21/472* (2011.01)

(52) U.S. Cl.
CPC .............. *G06F 9/5016* (2013.01); *G06T 1/60* (2013.01); *G06F 9/45558* (2013.01); *G06F 2009/45583* (2013.01); *G06F 2209/5014* (2013.01)

(58) Field of Classification Search
CPC .. G06F 9/45533; G06F 3/0664; G06F 3/0665; G06F 3/14; G06F 12/023; G06F 12/02; G06F 12/1036; G06T 1/20; G06T 1/60; G09G 5/363; G09G 5/39; G09G 5/393; G09G 5/395; H04L 29/08846
USPC .............................................. 345/543; 711/6
See application file for complete search history.

(56) References Cited

U.S. PATENT DOCUMENTS

| 5,875,474 | A | 2/1999 | Fabrizio et al. |
| 6,104,417 | A | 8/2000 | Nielsen et al. |
| 7,117,499 | B2 * | 10/2006 | Kawamoto et al. .......... 718/105 |
| 7,528,838 | B2 | 5/2009 | Gosalia et al. |
| 7,673,304 | B2 | 3/2010 | Gosalia et al. |
| 7,768,522 | B2 | 8/2010 | Stauffer et al. |
| 8,060,883 | B1 * | 11/2011 | Rao ....................... G06F 9/5077 709/226 |
| 8,214,619 | B1 * | 7/2012 | Connolly et al. ............. 711/171 |
| 8,589,557 | B1 * | 11/2013 | Labat et al. ................. 709/226 |
| 8,607,020 | B2 * | 12/2013 | Jacobs et al. ................ 711/173 |
| 2002/0108074 | A1 * | 8/2002 | Shimooka et al. ............ 714/25 |

(Continued)

OTHER PUBLICATIONS

"Intel 910GML/915GM/915GMS/915GV and 910GL Express Chipsets Intel Dynamic Video Memory Technology (DVMT) 3.0", White Paper, Intel, Aug. 2005, 24 pages.

*Primary Examiner* — Ulka Chauhan
*Assistant Examiner* — Sae Won Yoon
(74) *Attorney, Agent, or Firm* — Baker & Hostetler LLP

(57) ABSTRACT

Memory is reserved in a virtualized computing environment for graphics processing of each child partition in the computing environment. A video memory controller can identify video settings for child partitions. The video memory controller can determine an amount of memory for graphics processing for a child partition based on the video settings for that child partition. The video memory can also request an amount of memory to be reserved for that child partition based on the calculated amount of memory. Reserving memory for graphics processing of child partitions in this way allows for a sufficient amount of memory to be reserved for a child partition without wasting memory resources by reserving significantly more memory than is needed for the child partition.

18 Claims, 7 Drawing Sheets

(56) References Cited

U.S. PATENT DOCUMENTS

| | | | |
|---|---|---|---|
| 2004/0139287 A1* | 7/2004 | Foster et al. | 711/153 |
| 2005/0268047 A1* | 12/2005 | Aslot et al. | 711/147 |
| 2006/0146057 A1* | 7/2006 | Blythe | 345/506 |
| 2006/0233174 A1* | 10/2006 | Rothman et al. | 370/392 |
| 2007/0008324 A1* | 1/2007 | Green | 345/501 |
| 2007/0192329 A1* | 8/2007 | Croft et al. | 707/10 |
| 2007/0234031 A1* | 10/2007 | Garney | 713/2 |
| 2007/0234337 A1* | 10/2007 | Suzuki et al. | 717/168 |
| 2007/0276879 A1* | 11/2007 | Rothman | G06F 11/1438 |
| 2008/0256321 A1* | 10/2008 | Armstrong et al. | 711/173 |
| 2008/0256327 A1* | 10/2008 | Jacobs et al. | 711/207 |
| 2009/0063806 A1* | 3/2009 | Logan et al. | 711/173 |
| 2009/0113422 A1 | 4/2009 | Kani | |
| 2009/0118839 A1* | 5/2009 | Accapadi et al. | 700/28 |
| 2010/0115513 A1* | 5/2010 | Moriki et al. | 718/1 |
| 2010/0169536 A1* | 7/2010 | Shedel et al. | 711/6 |
| 2010/0186010 A1* | 7/2010 | Chalemin et al. | 718/1 |
| 2010/0198973 A1* | 8/2010 | Jung et al. | 709/226 |
| 2010/0217949 A1* | 8/2010 | Schopp et al. | 711/173 |
| 2010/0250883 A1* | 9/2010 | Oshida | 711/162 |
| 2010/0281285 A1* | 11/2010 | Blanding | 713/324 |
| 2011/0055518 A1* | 3/2011 | Hotra et al. | 712/29 |
| 2011/0093861 A1* | 4/2011 | Flemming et al. | 718/104 |
| 2011/0125894 A1* | 5/2011 | Anderson | H04L 9/3213 709/224 |
| 2011/0145555 A1* | 6/2011 | Nayar | G06F 1/3203 713/1 |
| 2011/0185062 A1* | 7/2011 | Foege | G06F 9/5077 709/226 |
| 2011/0225122 A1* | 9/2011 | Denuit et al. | 707/634 |
| 2011/0264879 A1* | 10/2011 | Hart et al. | 711/162 |
| 2013/0159663 A1* | 6/2013 | Levenglick | 711/206 |

\* cited by examiner

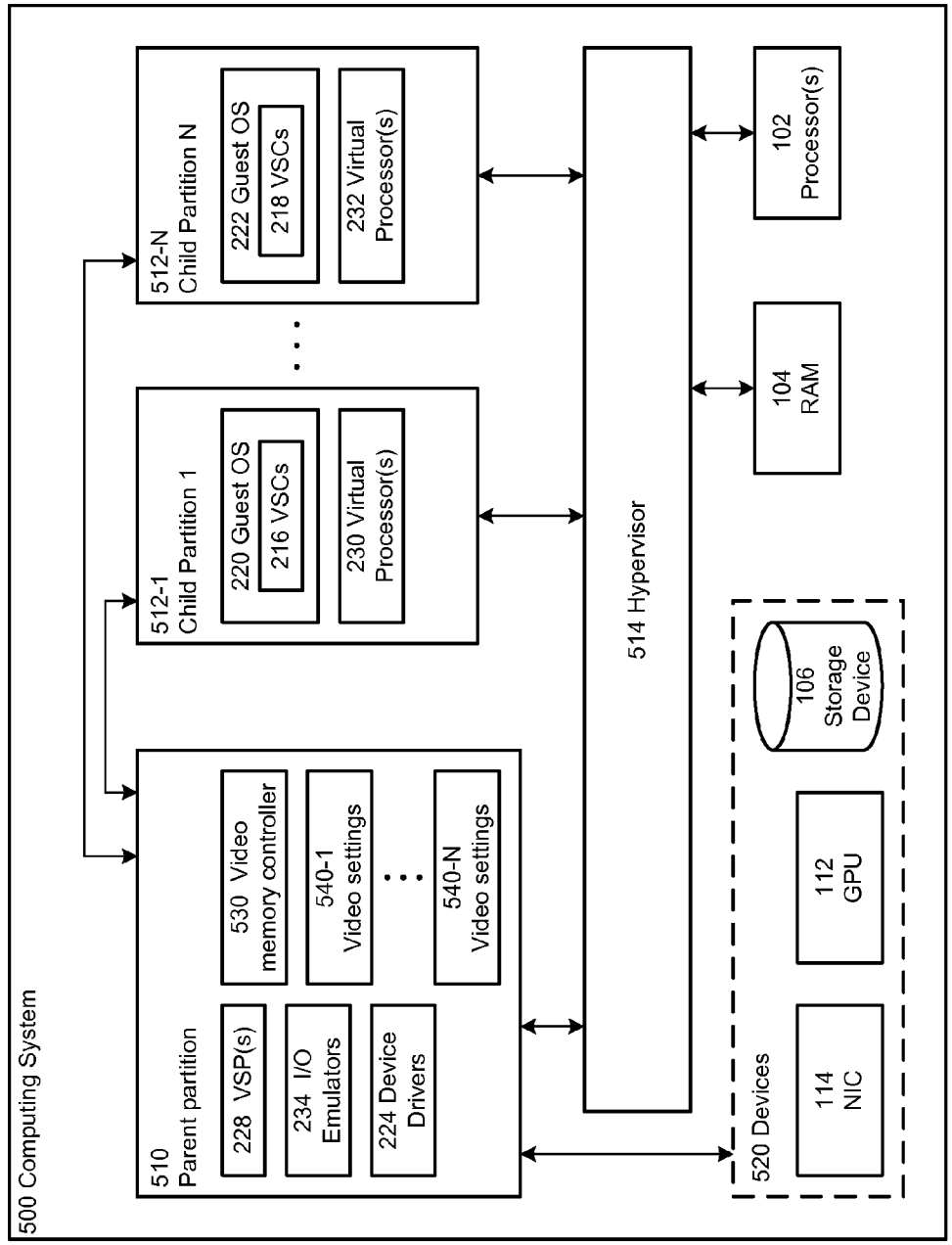

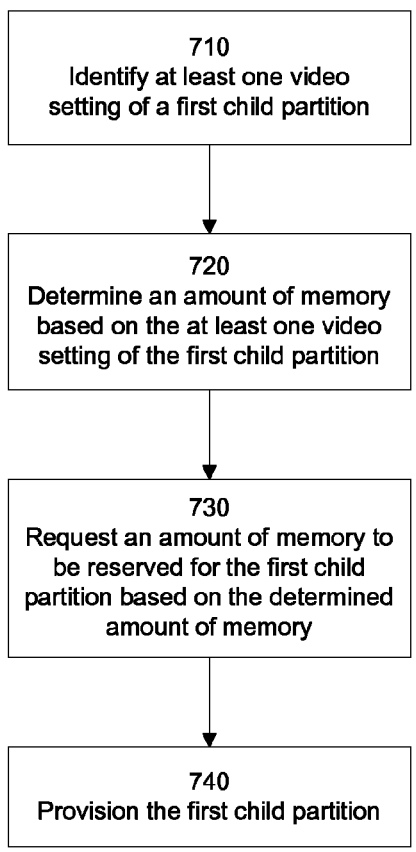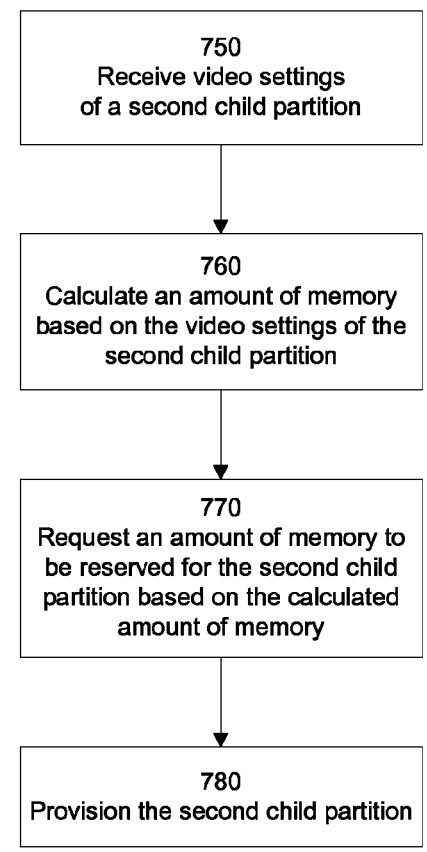
FIGURE 7A
FIGURE 7B

DYNAMIC PROVISIONING OF VIRTUAL VIDEO MEMORY BASED ON VIRTUAL VIDEO CONTROLLER CONFIGURATION

BACKGROUND

In a virtualization environment graphics processing for virtual machine partitions is performed using shared memory in a computing system. Shared memory can be allocated or reserved by virtualizing software (sometimes called a hypervisor or virtual machine monitor) installed on the computer system or by one of the virtual machine partitions (sometimes call a parent partition or root partition). Shared memory used to perform the graphics processing is similar to the memory on a graphics card that can be used in stand-alone computing systems.

SUMMARY

Embodiments of the present invention are directed to reserving memory for graphics processing for individual virtual machine partitions. In one embodiment, a video memory controller can identify at least one video setting for a first child partition. The video memory controller can determine, based on the at least one video setting for the first child partition, a first amount of memory for graphics processing for the first child partition. The video memory controller can request that a first requested amount of memory in the virtual computing environment be reserved for graphics processing for the first child partition, where the first requested amount of memory is based on the first amount of memory. In another embodiment, the video memory controller can identify at least one video setting for a second child partition. The video memory controller can determine, based on the at least one video setting for the second child partition, a second amount of memory for graphics processing for the second child partition. The video memory controller can request that a second requested amount of memory in the virtual computing environment be reserved for graphics processing for the second child partition, where the second requested amount of memory is based on the second amount of memory. In another embodiment, a value of the at least one video setting for the first child partition is different from a value of a corresponding at least one video setting for the second child partition. In another embodiment, the first requested amount of memory is different from the second requested amount of memory.

In other embodiment of the present invention, a computing system includes a plurality of child partitions and a video memory controller. The video memory controller can be configured to identify at least one video setting associated with a first child partition of the plurality of child partitions, to determine, based on the at least one video setting of the first child partition, a first amount of memory for graphics processing for the first child partition, and to request that a first requested amount of memory in the computing system be reserved for graphics processing for the first child partition, where the first requested amount of memory is based on the first amount of memory. In another embodiment, the video memory controller is further configured to identify at least one video setting associated with a second child partition of the plurality of child partitions, to determine, based on the at least one video setting for the second child partition, a second amount of memory for graphics processing for the second child partition, and to request that a second requested amount of memory in the virtual computing environment be reserved for graphics processing for the second child partition, where the second requested amount of memory is based on the second amount of memory.

In another embodiment of the present invention, the video settings for a child partition can include an indication of a height, an indication of a width, an indication of a color depth, an indication of a number of buffer display images, and an indication of a number of displays. The indication of a width and the indication of a height can be representative of a resolution for a display. In another embodiment, the video settings for a child partition can include an indication of a video standard. In another embodiment, the video settings for a child partition can include an indication of a number of displays and an indication of an amount of memory for a display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 depicts an example computing environment including a video memory controller.

FIGS. 7A and 7B depict example methods of reserving memory for graphics processing for child partitions.

DETAILED DESCRIPTION OF ILLUSTRATIVE EMBODIMENTS

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

It should be understood that the various techniques described herein may be implemented in connection with hardware, software, with a combination of both, or other means. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Figure 1:
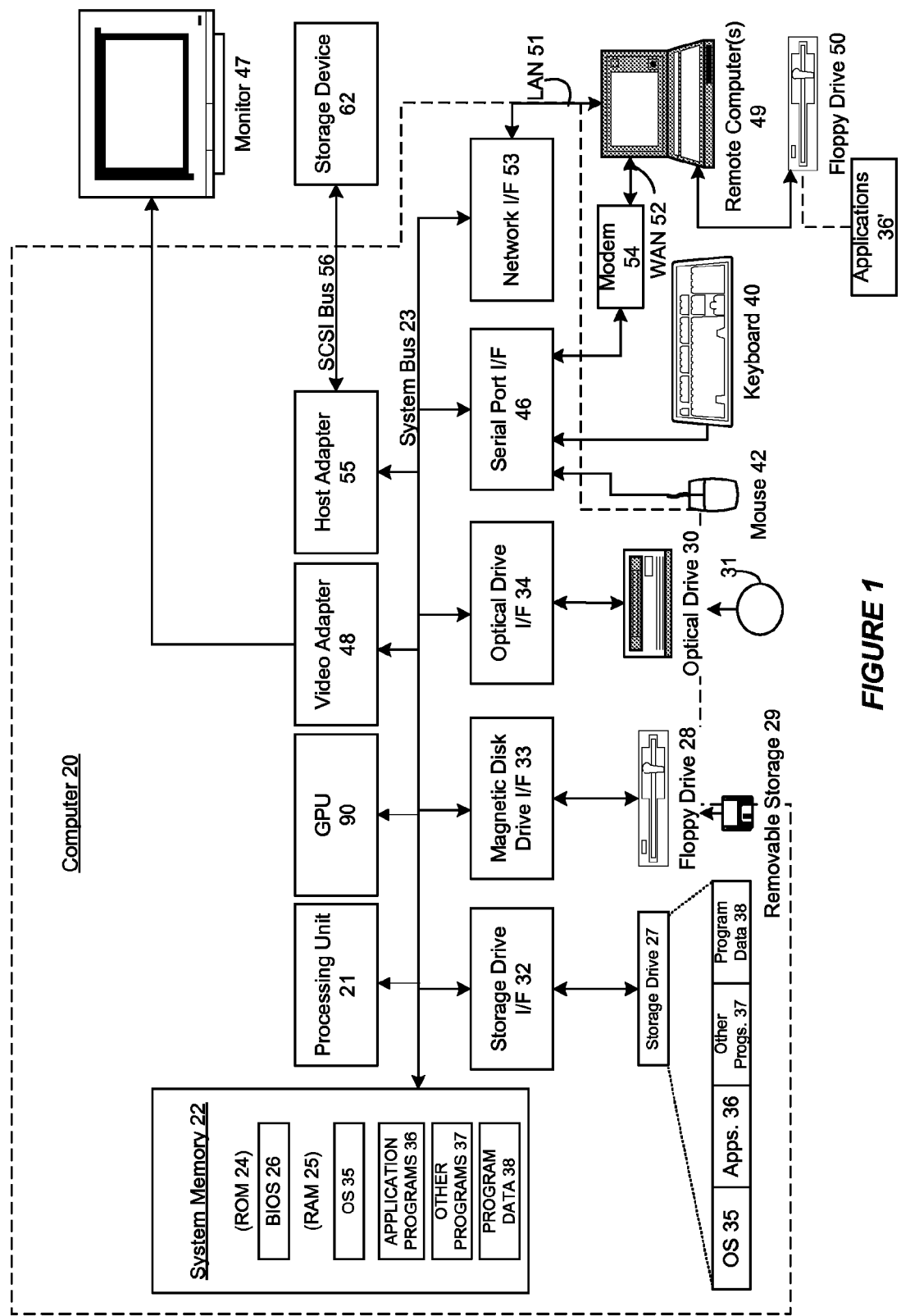
FIG. 1 depicts a block diagram of a computer system.

Embodiments of the present invention may execute on one or more computer systems. FIG. 1 and the following discussion are intended to provide a brief general description of a suitable computing environment in which embodiments of the invention may be implemented.

FIG. 1 depicts an example general purpose computing system. The general purpose computing system may include a conventional computer 20 or the like, including processing unit 21. Processing unit 21 may comprise one or more processors, each of which may have one or more processing cores. A multi-core processor, as processors that have more than one processing core are frequently called, comprises multiple processors contained within a single chip package.

Computer 20 may also comprise graphics processing unit (GPU) 90. GPU 90 is a specialized microprocessor optimized to manipulate computer graphics. Processing unit 21 may offload work to GPU 90. GPU 90 may have its own graphics memory, and/or may have access to a portion of system memory 22. As with processing unit 21, GPU 90 may comprise one or more processing units, each having one or more cores.

Computer 20 may also comprise a system memory 22, and a system bus 23 that communicative couples various system components including the system memory 22 to the processing unit 21 when the system is in an operational state. The system memory 22 can include read only memory (ROM) 24 and random access memory (RAM) 25. A basic input/output system 26 (BIOS), containing the basic routines that help to transfer information between elements within the computer 20, such as during start up, is stored in ROM 24. The system bus 23 may be any of several types of bus structures including a memory bus or memory controller, a peripheral bus, or a local bus, which implements any of a variety of bus architectures. Coupled to system bus 23 may be a direct memory access (DMA) controller 80 that is configured to read from and/or write to memory independently of processing unit 21. Additionally, devices connected to system bus 23, such as storage drive I/F 32 or magnetic disk drive I/F 33 may be configured to also read from and/or write to memory independently of processing unit 21, without the use of DMA controller 80.

The computer 20 may further include a storage drive 27 for reading from and writing to a hard disk (not shown) or a solid-state disk (SSD) (not shown), a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are shown as connected to the system bus 23 by a hard disk drive interface 32, a magnetic disk drive interface 33, and an optical drive interface 34, respectively. The drives and their associated computer-readable storage media provide non-volatile storage of computer readable instructions, data structures, program modules and other data for the computer 20. Although the example environment described herein employs a hard disk, a removable magnetic disk 29 and a removable optical disk 31, it should be appreciated by those skilled in the art that other types of computer readable media which can store data that is accessible by a computer, such as flash memory cards, digital video discs or digital versatile discs (DVDs), random access memories (RAMs), read only memories (ROMs) and the like may also be used in the example operating environment. Generally, such computer readable storage media can be used in some embodiments to store processor executable instructions embodying aspects of the present disclosure. Computer 20 may also comprise a host adapter 55 that connects to a storage device 62 via a small computer system interface (SCSI) bus 56.

A number of program modules comprising computer-readable instructions may be stored on computer-readable media such as the hard disk, magnetic disk 29, optical disk 31, ROM 24 or RAM 25, including an operating system 35, one or more application programs 36, other program modules 37, and program data 38. Upon execution by the processing unit, the computer-readable instructions cause actions described in more detail below to be carried out or cause the various program modules to be instantiated. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the INTERNET. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In an embodiment where computer 20 is configured to operate in a networked environment, OS 35 is stored remotely on a network, and computer 20 may netboot this remotely-stored OS rather than booting from a locally-stored OS. In an embodiment, computer 20 comprises a thin client where OS 35 is less than a full OS, but rather a kernel that is configured to handle networking and display output, such as on monitor 47.

Figure 2:
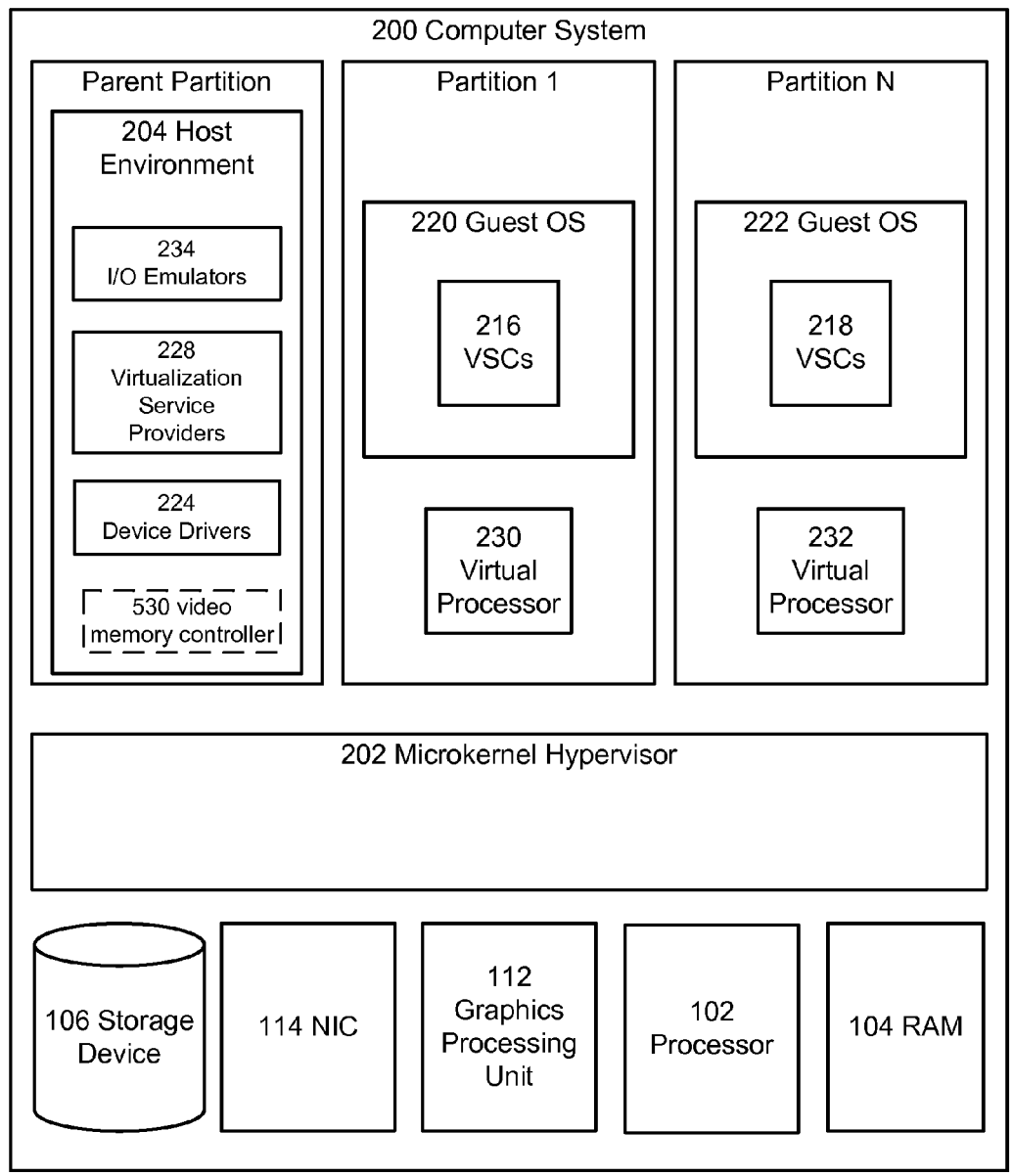
FIG. 2 depicts a block diagram of an exemplary architecture for a virtualizing software program.

Turning to FIG. 2, illustrated is an exemplary virtualization platform that can be used to generate virtual machines. In this embodiment, microkernel hypervisor 202 can be configured to control and arbitrate access to the hardware of computer system 200. Microkernel hypervisor 202 can generate execution environments called partitions such as child partition 1 through child partition N (where N is an integer greater than 1). Here, a child partition is the basic unit of isolation supported by microkernel hypervisor 202. Microkernel hypervisor 202 can isolate processes in one partition from accessing another partition's resources. In particular, microkernel hypervisor 202 can isolate kernel mode code of a guest operating system from accessing another partition's resources as well as user mode processes. Each child partition can be mapped to a set of hardware resources, e.g., memory, devices, processor cycles, etc., that is under control of the microkernel hypervisor 202. In embodiments, microkernel hypervisor 202 can be a stand-alone software product, a part of an operating system, embedded within firmware of the motherboard, specialized integrated circuits, or a combination thereof Microkernel hypervisor 202 can enforce partitioning by restricting a guest operating system's view of the memory in a physical computer system. When microkernel hypervisor 202 instantiates a virtual machine, it can allocate pages, e.g., fixed length blocks of memory with starting and ending addresses, of system physical memory (SPM) to the virtual machine as guest physical memory (GPM). Here, the guest's restricted view of system memory is controlled by microkernel hypervisor 202. The term guest physical memory is a shorthand way of describing a page of memory from the viewpoint of a virtual machine and the term system physical memory is shorthand way of describing a page of memory from the viewpoint of the physical system. Thus, a page of memory allocated to a virtual machine will have a guest physical address (the address used by the virtual machine) and a system physical address (the actual address of the page).

A guest operating system operating in a virtual partition, operates much the same way that an operating system operates on a physical machine. A guest operating system may virtualize guest physical memory through the same virtual memory management techniques that an operating system applies to physical memory. Virtual memory management is a technique that allows an operating system to over commit memory and to give an application sole access to a logically contiguous working memory. And just as an operating system uses page tables in a physical environment, in a virtualized environment, a guest operating system can use one or more page tables, called guest page tables in this context, to translate virtual addresses, known as virtual guest addresses into guest physical addresses. In this example, a memory address may have a guest virtual address, a guest physical address, and a system physical address.

In the depicted example, parent partition component, which can also be thought of as similar to domain 0 of Xen's open source hypervisor can include a host environment 204. Host environment 204 can be an operating system (or a set of configuration utilities) and host environment 204 can be configured to provide resources to guest operating systems executing in the child partitions 1-N by using virtualization service providers 228 (VSPs). VSPs 228, which are typically referred to as back-end drivers in the open source community, can be used to multiplex the interfaces to the hardware resources by way of virtualization service clients (VSCs) (typically referred to as front-end drivers in the open source community or paravirtualized devices). As shown by the figures, virtualization service clients execute within the context of guest operating systems. However, these drivers are different than the rest of the drivers in the guest in they communicate with host environment 204 via VSPs instead of communicating with hardware or emulated hardware. In an exemplary embodiment the path used by virtualization service providers 228 to communicate with virtualization service clients 216 and 218 can be thought of as the enlightened IO path.

As shown by the figure, emulators 234, e.g., virtualized IDE devices, virtualized video adaptors, virtualized NICs, etc., can be configured to run within host environment 204 and are attached to emulated hardware resources, e.g., IO ports, guest physical address ranges, virtual VRAM, emulated ROM ranges, etc. available to guest operating systems 220 and 222. For example, when a guest OS touches a guest virtual address mapped to a guest physical address where a register of a device would be for a memory mapped device, microkernel hypervisor 202 can intercept the request and pass the values the guest attempted to write to an associated emulator. Here, the emulated hardware resources in this example can be thought of as where a virtual device is located in guest physical address space. The use of emulators in this way can be considered the emulation path. The emulation path is inefficient compared to the enlightened IO path because it requires more CPU time to emulate devices than it does to pass messages between VSPs and VSCs. For example, several actions on memory mapped to registers are required in order to write a buffer to disk via the emulation path, while this may be reduced to a single message passed from a VSC to a VSP in the enlightened IO path.

Each child partition can include one or more virtual processors (230 and 232) that guest operating systems (220 and 222) can manage and schedule threads to execute thereon. Generally, the virtual processors are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to processors of the computer system such that the instructions that effectuate the virtual processors will be directly executed by physical processors. Thus, in an embodiment including multiple processors, virtual processors can be simultaneously executed by processors while, for example, other processor execute hypervisor instructions. The combination of virtual processors and memory in a partition can be considered a virtual machine.

Guest operating systems (220 and 222) can be any operating system such as, for example, operating systems from MICROSOFT, APPLE, the open source community, etc. The guest operating systems can include user/kernel modes of operation and can have kernels that can include schedulers, memory managers, etc. Generally speaking, kernel mode can include an execution mode in a processor that grants access to at least privileged processor instructions.

Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 3:
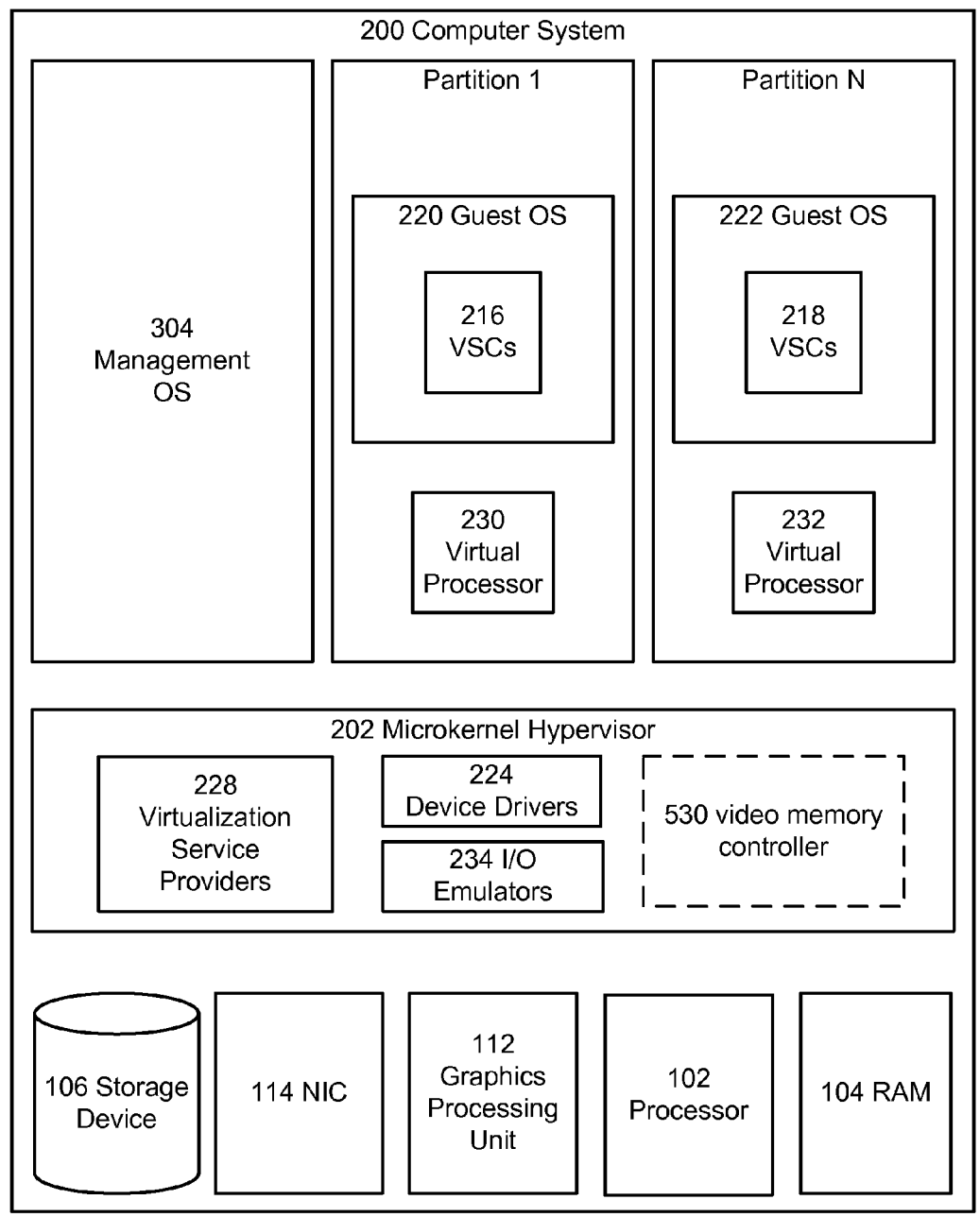
FIG. 3 depicts a block diagram of an alternative architecture for a virtualizing software program.

Referring now to FIG. 3, it illustrates an alternative virtualization platform to that described above in FIG. 2. FIG. 3 depicts similar components to those of FIG. 2; however, in this example embodiment hypervisor 302 can include a microkernel component and components similar to those in host environment 204 of FIG. 2 such as the virtualization service providers 228 and device drivers 224, while management operating system 304 may contain, for example, configuration utilities used to configure hypervisor 302. In this architecture, hypervisor 302 can perform the same or similar functions as microkernel hypervisor 202 of FIG. 2; however, in this architecture hypervisor 304 effectuates the enlightened IO path and includes the drivers for the physical hardware of the computer system. Hypervisor 302 of FIG. 3 can be a stand-alone software product, a part of an operating system, embedded within firmware of the motherboard or a portion of hypervisor 302 can be effectuated by specialized integrated circuits.

Figure 4A:
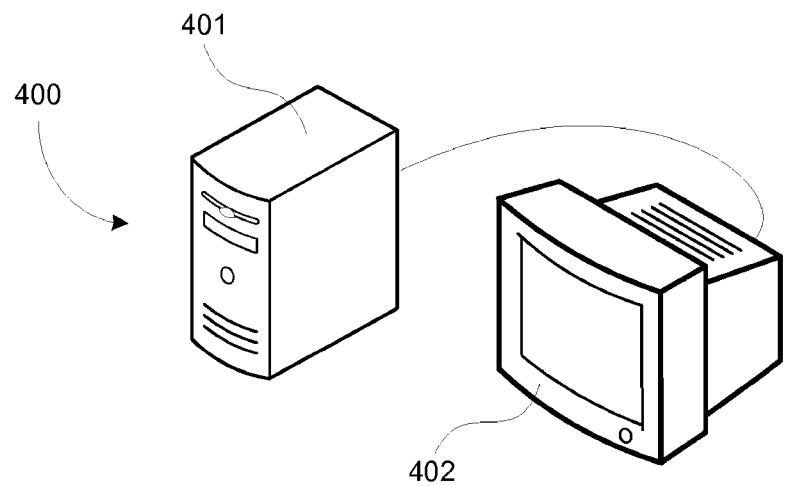
FIGS. 4A and 4B depict example computing systems including computing devices connected to one or more displays.

Referring now to FIG. 4A is an example computing system 400 with a computing device 401 connected to a display 402. The computing device 401 can include a physical graphics processing card (not shown) which includes a certain amount of memory. The memory of a graphics card can be used to buffer data that is sent to the display 402. The display 402 may be able to display images at a particular resolution or within a range of possible resolutions. Display resolution refers to a width and a height of display images, sometimes expressed as numbers of pixels. For example, the display 402 may support a resolution of 640×480 (i.e., 640 pixels wide by 480 pixels high), a resolution of 800×600, and a resolution of 1024×768. The display 402 may also be able to display a certain color depth or a range of color depths. Color depth refers to the number of bits required to describe the color of a single pixel. For example, a color depth of 1 bpp (bit per pixel) can describe two colors at each pixel, a color depth of 8 bpp can describe 256 colors at each pixel, a color depth of 24 bpp can describe 16,777,216 colors at each pixel, and so forth.

Various video standards have been established for use with displays, such as computer monitors and televisions. Some video standards are set forth in Table 1 below. The display 402 can be configured to display images according to one or more of these standards. The amount of memory needed to buffer a single display image depends on the resolution and the color depth of the image. For example, the SVGA standard uses a resolution of 800×600 (480,000 total pixels) at a color depth of 4 bpp. Thus, a single display image according to the SVGA standard includes 1,920,000 bits of data. Additionally, computing device 401 may buffer more than one display image for display 402. For example, computing device 401 may buffer two display images, the display image that is currently being displayed on display 402 and the display image that is next to be displayed by display 402. The computing device 401 may dedicate sufficient memory to graphics processing to buffer the number of display images at a particular resolution and color depth for the display 402.

TABLE 1

Select Video Standards

| Standard | Resolution (pixels) | Aspect Ratio | Color depth |
|---|---|---|---|
| CGA (color graphics adapter) | 640 × 200 (128k) | 16:5 | 1 bpp |
| | 320 × 200 (64k) | 16:10 | 2 bpp |
| | 160 × 200 (32k) | 4:5 | 4 bpp |
| VGA (video graphics array) | 640 × 480 (307k) | 4:3 | 4 bpp |
| | 640 × 350 (224k) | 64:35 | 4 bpp |
| | 320 × 200 (64k) | 16:10 | 4/8 bpp |
| SVGA (super video graphics array) | 800 × 600 (480k) | 4:3 | 4 bpp |
| XGA (extended graphics array) | 1024 × 768 (786k) | 4:3 | 8 bpp |
| | 640 × 480 (307k) | 4:3 | 16 bpp |
| HD (780p) | 1366 × 768 (1049k) | 16:9 | 32 bpp |
| Full HD (1080p) | 1920 × 1080 (2073k) | 16:9 | 32 bpp |

A computing device, such as computing device 401, may have a limited amount of memory dedicated to graphics processing. The amount of memory reserved for graphics processing in computing device 401 may be insufficient to meet the highest resolution and color depth that the display 402 is capable of displaying images. In such a case, the display 402 may display images at a lower resolution and/or color depth than the display 402 is capable of displaying images. Alternatively, computing device 401 may reserve substantially more memory for graphics processing than are needed for the highest resolution and color depth that the display 402 is capable of displaying images. In this case, the excess memory that computing device 401 has reserved for graphics processing may be wasted because the excess reserved memory may not be available for other uses in computing device 401.

Figure 4B:
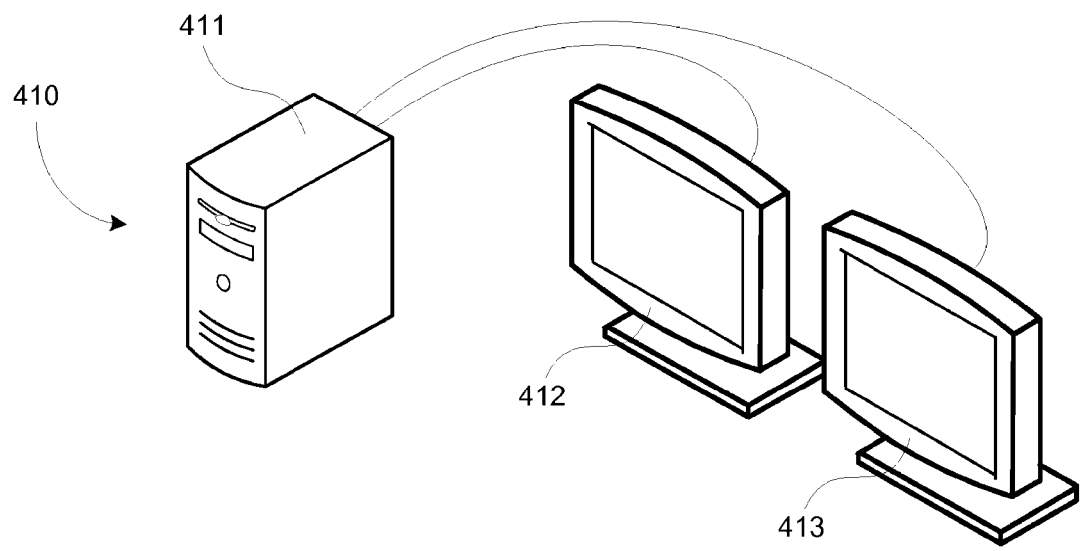

Referring now to FIG. 4B, depicted is a computing system 410 that includes a computing device 411 connected to two displays 412 and 413. The two displays 412 and 413 may display images at the same resolution and color depth, or they may display images at different resolutions and/or color depths. The two displays 412 and 413 may also be connected to a single graphics card (not shown) that supports multiple displays or they may be connected to separate graphics cards (not shown) that each support a single display. The computing device 411 may have memory dedicated to graphics processing to buffer display images for both displays 412 and 413. If the two displays 412 and 413 operate at the same resolution, at the same color depth, and using the same number of buffered display images, then the computing device 411 can reserve twice the amount of memory for graphics processing as it would need if only one of the two displays 412 and 413 was connected to the computing device 411. One of ordinary skill in the art would understand that computing devices are not limited to being connected to only one or two displays, as depicted in FIGS. 4A and 4B, but computing devices can be connected to any number of displays.

Examples of amounts of memory that can be reserved for graphics processing for a computing system, based on the resolution, the color depth, the number of buffer images, and the number of displays, are provided in Table 2.

TABLE 2

Memory Reserved for Displays

| Resolution | | Color depth | Buffer | Memory Reserved (MB) | | | |
|---|---|---|---|---|---|---|---|
| Width | Height | (BPP) | Images | 1 Display | 2 Displays | 3 Displays | 4 Displays |
| 640 | 480 | 4 | 2 | 2.4 | 4.8 | 7.2 | 9.6 |
| 800 | 600 | 4 | 2 | 3.8 | 7.6 | 11.4 | 15.2 |
| 1024 | 768 | 4 | 2 | 6 | 12 | 18 | 24 |
| 1280 | 720 | 4 | 2 | 7.2 | 14.4 | 21.6 | 28.8 |
| 1280 | 768 | 4 | 2 | 7.6 | 15.2 | 22.8 | 30.4 |
| 1280 | 800 | 4 | 2 | 8 | 16 | 24 | 32 |
| 1280 | 1024 | 4 | 2 | 10 | 20 | 30 | 40 |
| 1440 | 900 | 4 | 2 | 10 | 20 | 30 | 40 |
| 1400 | 1050 | 4 | 2 | 11.4 | 22.8 | 34.2 | 45.6 |
| 1600 | 1200 | 4 | 2 | 14.8 | 29.6 | 44.4 | 59.2 |
| 1680 | 1050 | 4 | 2 | 13.6 | 27.2 | 40.8 | 54.4 |
| 1920 | 1080 | 4 | 2 | 16 | 32 | 48 | 64 |
| 1920 | 1200 | 4 | 2 | 17.6 | 35.2 | 52.8 | 70.4 |
| 2560 | 1600 | 4 | 2 | 31.4 | 62.8 | 94.2 | 125.6 |
| 4096 | 2048 | 4 | 2 | 64 | 128 | 192 | 256 |
| 8192 | 8192 | 4 | 2 | 512 | 1024 | 1536 | 2048 |

Referring now to FIG. 5, depicted is an embodiment of a computing system 500. Computing system 500 includes a parent partition 510 and child partitions 512-1 to 512-N. A hypervisor 514 can multiplex the resources of processor(s) 102 and RAM 104 among each of the hosted parent partition 510 and child partitions 512-1 to 512-N. As shown, the parent partition 510 can have access to hardware devices 520 in the computer system 500. The parent partition 510 can communicate with each of child partitions 512-1 to 512-N individually. The hypervisor 514 can also communicate with each of child partitions 512-1 to 512-N individually.

Parent partition 510 can include a virtual video memory controller 530 that can request that hypervisor 514 reserve an amount of memory for graphics processing for each child partition 512-1 to 512-N. When one of child partitions 512-1 to 512-N is provisioned, video memory controller 530 may request that hypervisor 202 reserve a particular amount of memory for graphics processing for each of child partitions 512-1 to 512-N. One way that video memory controller 530 may request that memory be reserved is to request that the same about of memory be reserved for each of the child partitions 512-1 to 512-N. For example, video memory controller 530 may request that sufficient memory be reserved for two SVGA displays for each child partition. However, the approach of reserving the same amount of memory for each child partition can lead to less than optimal performance of the computing system 500 and the child partitions 512-1 to 512-N. In one example, if a child partition has only one VGA display associated with it, then the video memory controller 530 will have reserved more memory than the child partition can use for graphics processing. The excess reserved memory may be a wasted resource because it may not be available for other uses in the computing system 500. In another example, if four Full HD displays are associated with the provisioned child partition, then the video memory controller 530 will not have reserved enough memory for the child partition to be able to provide graphics processing for all four Full HD displays. In this case, the child partition will need to limit the resolution, the color depth, and/or the number of displays used because it does not have enough memory available for the child partition to provide graphics processing for all four Full HD displays. In both of these examples, the computing system 500 is not operating at optimal performance because either too much memory has been reserved for graphics processing or a child partition does not have enough memory reserved to provide the level of graphics that are capable of being displayed.

One solution to this problem is for the video memory controller 530 to adjust the amount of memory reserved for each provisioned child partition. For example, if the video memory controller 530 is generally reserving more memory for graphics processing than is being used by child partitions 512-1 to 512-N, then the video memory controller 530 can lower the amount of memory that is requested when a child partition is provisioned. However, lowering the amount of memory requested for each child partition may result in more child partitions not having sufficient memory for graphics processing for their associated displays. Similarly, if the video memory controller 530 is generally reserving less memory for graphics processing than is being used by child partitions 512-1 to 512-N, then the video memory controller 530 can raise the amount of memory that is requested for each child partition. However, raising the amount of memory that is reserved for child partitions may result in significantly more memory being reserved for graphics processing of child partitions that is not being used by child partitions for graphics processing.

In another solution, video settings corresponding to each of the child partitions can be stored in the computing system. In the embodiment depicted in FIG. 5, video settings 540-1 to 540-N, each corresponding to child partitions 512-1 to 512-N, can be stored in parent partition 510. Video settings 540-1 to 540-N can include information that can be used by video memory controller 530 to determine how much memory to request when reserving memory for the corresponding child partition 512-1 to 512-N. Video settings 540-1 to 540-N can be set by an administrator or user prior to the corresponding child partitions 512-1 and 512-N being provisioned in the computing system 500. If video settings 540-1 to 540-N are set before the corresponding child partition 512-1 to 512-N is provisioned, the video memory controller 530 can negotiate and authorize those video settings 540-1 to 540-N to ensure that the video settings 540-1 to 540-N will not cause any issues with provisioning of the corresponding child partition 512-1 to 512-N. While the embodiment depicted in FIG. 5 shows video settings 540-1 to 540-N stored in parent partition 510, video settings 540-1 to 540-N can be stored in other locations in the computing system 500 where they can be accessed by video memory controller 530. In addition, while video memory controller 530 is depicted in FIG. 5 as a virtual video memory controller, computing system 500 could also include a physical video memory controller that is configured to perform the same functions as those described with respect to virtual video memory controller 530.

Video settings, in one embodiment, could include an indication of a height, an indication of a width, an indication of a color depth, an indication of a number of buffer display images, and an indication of a number of displays. In another embodiment, the video settings could include an indication of an amount of memory that video memory controller should request to be reserved. In another embodiment, the video settings could include an indication of a number of displays and an indication of an amount of memory for each display. In another embodiment, the video settings could include an indication of a video standard and in indication of a number of displays. One of ordinary skill in the art would recognize that there are numerous other combinations of information that would enable the video controller 530 to determine how much memory to request to be reserved for a child partition.

Based on the information in the video settings for a particular child partition, the video memory controller can determine a particular amount of memory for that particular child partition. For example, video settings 540-1 for child partition 512-1 can include an indication of a height H, an indication of a width W, an indication of a color depth CD, an indication of a number of buffer display images BDI, and an indication of a number of displays D. Video memory controller 530 can identify at least one of the video settings 540-1 which are associated with child partition 512-1. Video memory controller 530 can determine an amount of memory based on at least one of the video settings 540-1. In one embodiment, video memory controller 530 can determine an amount of memory M based on the following formula:

$$M=H \times W \times CD \times D \times BDI$$

Once the video memory controller 530 calculates the amount of memory M, it can request that hypervisor 513 reserve an amount of memory for graphics processing by child partition 512-1 based on the calculated amount of memory.

One advantage to identifying and using individual video settings 540-1 to 540-N for each child partition 512-1 to 512-N is that video memory controller can request a different amount of memory to be reserved for each child partition. Another advantage is that the calculated amount of memory can be based on settings identified for that particular child partition. If appropriate video settings are set for each child partition, video memory controller 530 will be able to reserve sufficient memory for graphics processing for the one or more displays associated with each child partition while not reserving more significantly more memory than each child partition can use for graphics processing.

Figure 6:
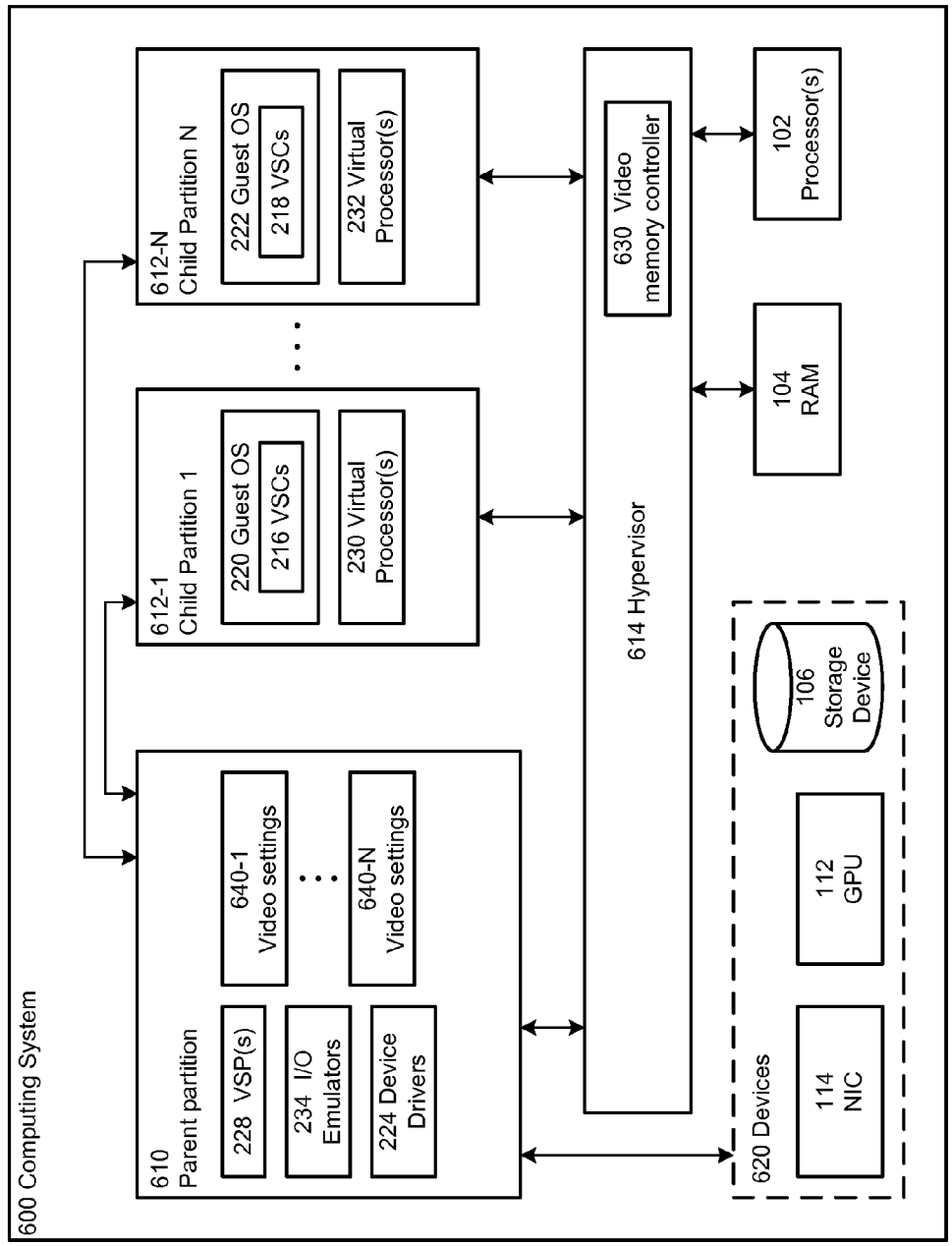
FIG. 6 depicts another example computing environment including a video memory controller.

Referring now to FIG. 6, depicted is an embodiment of a computing system 600. Computing system 600 includes a parent partition 610 and child partitions 612-1 to 612-N. A hypervisor 614 can multiplex the resources of processor(s) 102 and RAM 104 among each of the hosted parent partition 610 and child partitions 612-1 to 612-N. As shown, the parent partition 610 has access to hardware devices 620 in the computer system 600. The parent partition 610 can communicate with each of child partitions 612-1 to 612-N individually. The hypervisor 614 can also communicate with each of child partitions 612-1 to 612-N individually.

Computing system 600 can also include a virtual video memory controller 630 that can operate in similar manner to the virtual video memory controller 530 described above with respect to FIG. 5. However, video memory controller 630 is included as part of hypervisor 614. Video settings 640-1 to 640-N, each corresponding to child partitions 612-1 to 612-N, can be stored in computing system 600. As shown in the embodiment depicted in FIG. 6, video settings 640-1 to 640-N can be stored in parent partition 610. In one embodiment, video settings 640-1 and 640-N can be set by an administrator or user prior to the corresponding child partitions 612-1 and 612-N being provisioned in the computing system 600. Video settings 640-1 to 640-N can include information that can be used by video memory controller 630 to determine how much memory to request when reserving memory for the corresponding child partition 612-1 to 612-N. For example, with respect to child partition 512-1, video memory controller 630 can identify at least one of the video settings 640-1 which are associated with child partition 512-1. Video memory controller 630 can determine an amount of memory based on at least one of the video settings 640-1. Once the video memory controller 630 calculates the amount of memory for a particular child partition, it can request that hypervisor 614 reserve an amount of memory for graphics processing by that particular child partition based on the calculated amount.

Referring now to FIG. 7A, depicted is a method of reserving memory for graphics processing for a first child partition. A video memory controller can identify 710 at least one video setting of the first child partition. The video memory controller can determine 720 an amount of memory based on the at least one video setting of the first child partition. The video memory controller can also request 730 that an amount of memory be reserved for the first child partition based on the determined amount of memory. Optionally, the first child partition can be provisioned 740 after video memory controller requests the amount of memory. The first child partition can also be provisioned before the video memory controller identifies 710 at least one video setting of the first child partition or while the video memory controller performs any of steps 710, 720, and 730. Optionally, while not shown in FIG. 7A, the video memory controller can negotiate video settings for the first child partition before the video memory controller identifies 710 the at least one video setting of the first child partition.

Referring now to FIG. 7B, depicted is a method of reserving memory for graphics processing for a second child partition. A video memory controller can identify 750 at least one video setting of the second child partition. The video memory controller can determine 760 an amount of memory based on the at least one video setting of the second child partition. The video memory controller can also request 770 that an amount of memory be reserved for the second child partition based on the determined amount of memory. Optionally, the second child partition can be provisioned 780 after video memory controller requests the amount of memory. The second child partition can also be provisioned before the video memory controller identifies 750 at least one video setting of the second child partition or while the video memory controller performs any of steps 750, 760, and 770. Optionally, while not shown in FIG. 7B, the video memory controller can negotiate video settings for the second child partition before the video memory controller identifies 750 the at least one video setting of the second child partition.

The methods depicted in FIGS. 7A and 7B can be performed consecutively. The methods depicted in FIGS. 7A and 7B can also be performed concurrently or at least partially concurrently. The video settings of the first child partition can be different from the video settings of the second child partition. The amount of memory requested to be reserved for the first child partition can be different from the amount of memory requested to be reserved for the second child partition.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof While particular aspects of the various inventions disclosed herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed:

1. A method of dynamically provisioning memory for graphics processing in a virtual computing environment, the virtual computing environment comprising a video memory controller and being capable of hosting a plurality of child partitions, the method comprising:
receiving, by the video memory controller in the virtual computing environment, a first input comprising an indication of at least one video setting of one or more displays to be associated with a first child partition;
determining, by the video memory controller, a first amount of memory for graphics processing for the first child partition based on the at least one video setting indicated by the first input;
negotiating and authorizing, by the video memory controller, a negotiated amount of memory for the first child partition different from a video setting stored in the virtual computing environment prior to the child partition being provisioned;
requesting, by the video memory controller, that a first requested amount of memory in the virtual computing environment be reserved for the graphics processing for the first child partition, wherein the first requested amount of memory is based on at least one of the first amount of memory or the negotiated amount of memory; and
provisioning the virtual computing environment with the first child partition after receiving the first input, after determining the first amount of memory, and after requesting that the first requested amount of memory in the virtual computing environment be reserved.

2. The method of claim 1, further comprising:
receiving, by the video memory controller in the virtual computing environment, a second input comprising an indication of at least one video setting of one or more displays to be associated with a second child partition;
determining, by the video memory controller, the second amount of memory based on the at least one video setting indicated by the second input;
requesting, by the video memory controller, that a second requested amount of memory in the virtual computing environment be reserved for graphics processing for the second child partition, wherein the second requested amount of memory is based on the second amount of memory; and
provisioning the second child partition in the virtual computing environment after receiving the second input, after determining the second amount of memory, and after requesting that the second requested amount of memory in the virtual computing environment be reserved.

3. The method of claim 2, wherein a value of the at least one video setting for the first child partition is different from a value of a corresponding at least one video setting for the second child partition.

4. The method of claim 2, wherein the first requested amount of memory is different from the second requested amount of memory.

5. The method of claim 1, wherein the at least one video setting for the first child partition comprises one or more of the group consisting of: an indication of a height, an indication of a width, an indication of a color depth, an indication of a number of buffer display images, and an indication of a number of displays.

6. The method of claim 1, wherein the at least one video setting for the first child partition comprises one or more of the group consisting of: an indication of a number of displays, and an indication of an amount of memory for a display.

7. The method of claim 1, wherein the stored video setting has been stored in a parent partition of the virtual computing environment prior to the child partition being provisioned.

8. A computing system, comprising:
a plurality of child partitions; and
a video memory controller configured to:
receive a first input comprising an indication of at least one video setting of one or more displays to be associated with a first child partition;
determine, based on the at least one video setting indicated by the first input, a first amount of memory for graphics processing for the first child partition;
negotiate and authorize, by the video memory controller, a negotiated amount of memory for the first child partition different from a video setting stored in the virtual computing environment prior to the child partition being provisioned; and
request that a first requested amount of memory in the computing system be reserved for the graphics processing for the first child partition, wherein the first requested amount of memory is based on at least one of the first amount of memory or the negotiated amount of memory;
the computing system being provisioned with the first child partition as one of the plurality of child partitions after the video memory controller receives the first input, after the video memory controller determines the first amount of memory, and after the video memory controller requests that the first requested amount of memory in the computing system be reserved.

9. The computing system of claim 8, wherein the video memory controller is further configured to:
receive a second input comprising an indication of at least one video setting of one or more displays to be associated with a second child partition;
determine, based on the at least one video setting indicated by the second input, a second amount of memory for graphics processing for the second child partition; and
request that a second requested amount of memory in the computing system be reserved for the graphics processing for the second child partition, wherein the second requested amount of memory is based on the second amount of memory;
the computing system being configured to provision the second child partition as one of the plurality of child partitions in the computing system after the video memory controller receives the second input, after the video memory controller determines the second amount of memory, and after the video memory controller requests that the second requested amount of memory in the computing system be reserved.

10. The computing system of claim 9, wherein a value of the at least one video setting for the first child partition is different from a value of a corresponding at least one video setting for the second child partition.

11. The computing system of claim 9, wherein the first requested amount of memory is different from the second requested amount of memory.

12. The computing system of claim 8, the system further comprising:
a parent partition comprising the video memory controller.

13. The computing system of claim 8, the system further comprising:
a hypervisor comprising the video memory controller.

14. A computer readable disk or device having instructions embodied thereon for dynamically provisioning memory for graphics processing in a virtual computing environment, the virtual computing environment comprising a video memory controller and being capable of hosting a plurality of child partitions, the instructions comprising:
instructions to receive, by the video memory controller in the virtual computing environment, a first input comprising an indication of at least one video setting of one or more displays to be associated with a first child partition;
instructions to determine, by the video memory controller, a first amount of memory for graphics processing for the first child partition based on the at least one video setting indicated by the first input;
instructions to negotiate and authorize, by the video memory controller, a negotiated amount of memory for the first child partition different from a video setting stored in the virtual computing environment prior to the child partition being provisioned;
instructions to request, by the video memory controller, that a first requested amount of memory in the virtual computing environment be reserved for the graphics processing for the first child partition, wherein the first requested amount of memory is based on at least one of the first amount of memory or the negotiated amount of memory; and
instructions to provision the virtual computing environment with the first child partition after receiving the first input, after determining the first amount of memory, and after requesting that the first requested amount of memory in the virtual computing environment be reserved.

15. The computer readable disk or device of claim 14, the instructions further comprising:
instructions to receive, by the video memory controller in the virtual computing environment, a second input comprising an indication of at least one video setting of one or more displays to be associated with a second child partition;
instructions to determine, by the video memory controller, wherein the second amount of memory is based on the at least one video setting indicated by the second input;
instructions to request, by the video memory controller, that a second requested amount of memory in the virtual computing environment be reserved for graphics processing for the second child partition, the second requested amount of memory based on the second amount of memory; and
instructions to provision the second child partition in the virtual computing environment after receiving the second input, after determining the second amount of memory, and after requesting that the second requested amount of memory in the virtual computing environment be reserved.

16. The computer readable disk or device of claim 15, wherein a value of the at least one video setting for the first child partition is different from a value of a corresponding at least one video setting for the second child partition.

17. The computer readable disk or device of claim 15, wherein the first requested amount of memory is different from the second requested amount of memory.

18. The computer readable disk or device of claim 14, wherein the at least one video setting for the first child partition comprises one or more of the group consisting of: an indication of a height, an indication of a width, an indication of a color depth, an indication of a number of buffer display images, an indication of a number of displays, an indication of a video standard, and an indication of an amount of memory for a display.

* * * * *